(12) United States Patent
Shin et al.

(10) Patent No.: US 11,454,782 B2
(45) Date of Patent: Sep. 27, 2022

(54) IMAGING LENS SYSTEM

(71) Applicant: SAMSUNG ELECTRO-MECHANICS CO., LTD., Suwon-si (KR)

(72) Inventors: Kil Soo Shin, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 233 days.

(21) Appl. No.: 16/590,599

(22) Filed: Oct. 2, 2019

(65) Prior Publication Data
US 2020/0393649 A1  Dec. 17, 2020

(30) Foreign Application Priority Data
Jun. 17, 2019  (KR) .................. 10-2019-0071430

(51) Int. Cl.
G02B 9/60 (2006.01)
G02B 9/64 (2006.01)
G02B 13/00 (2006.01)
H04N 5/225 (2006.01)

(52) U.S. Cl.
CPC .............. *G02B 9/64* (2013.01); *G02B 9/60* (2013.01); *G02B 13/0045* (2013.01); *H04N 5/2254* (2013.01)

(58) Field of Classification Search
None
See application file for complete search history.

(56) References Cited

U.S. PATENT DOCUMENTS

| 10,133,036 | B1* | 11/2018 | Wang ................ G02B 9/64 |
| 2014/0139719 | A1 | 5/2014 | Fukaya |
| 2014/0184845 | A1* | 7/2014 | Nakayama ........... G02B 13/04 |
| | | | 348/222.1 |
| 2016/0223790 | A1 | 8/2016 | Liao et al. |
| 2017/0235102 | A1 | 8/2017 | Lai et al. |
| 2018/0149835 | A1* | 5/2018 | Park .................. G02B 9/64 |
| 2019/0004285 | A1 | 1/2019 | Tang et al. |
| 2019/0121086 | A1 | 4/2019 | Shi et al. |
| 2019/0146184 | A1 | 5/2019 | Xu et al. |

(Continued)

FOREIGN PATENT DOCUMENTS

| CN | 107621683 A | 1/2018 |
| CN | 107678131 A | 2/2018 |

(Continued)

OTHER PUBLICATIONS

Korean Office Action dated Sep. 7, 2020 in the corresponding Korean Patent Application No. 10-2019-0071430 (7 pages in English, 5 pages in Korean).

(Continued)

*Primary Examiner* — Darryl J Collins
(74) *Attorney, Agent, or Firm* — NSIP Law

(57) ABSTRACT

An imaging lens system includes a first lens, a second lens, a third lens, a fourth lens, and a fifth lens, sequentially disposed at intervals from an object side of the imaging lens system. A refractive index of each of the second lens, the third lens, the fourth lens, and the fifth lens is 1.6 or greater, and TTL/2IH<0.730, where TTL is a distance from an object side surface of the first lens to an imaging plane, and 2IH is a diagonal length of the imaging plane.

17 Claims, 10 Drawing Sheets

(56) References Cited

U.S. PATENT DOCUMENTS

2019/0170966 A1\* 6/2019 Wenren .............. G02B 27/0025
2019/0170987 A1  6/2019 Gao et al.
2020/0073085 A1\* 3/2020 Huang ................ G02B 15/173

FOREIGN PATENT DOCUMENTS

| CN | 107817581 A | 3/2018 |
|---|---|---|
| JP | 2014-102408 | 6/2014 |
| JP | 2015-72403 A | 4/2015 |
| KR | 10-2018-0059396 A | 6/2018 |
| TW | I657282 B | 4/2019 |

OTHER PUBLICATIONS

Korean Office Action dated Jul. 15, 2021 in counterpart Korean Patent Application No. 10-2021-0082542 (9 pages in English and 5 pages in Korean).

Chinese Office Action dated Jan. 21, 2022, in counterpart Chinese Patent Application No. 201911345151.X (8 pages in English, 9 pages in Mandarin).

Korean Office Action dated Jul. 20, 2022, in counterpart Korean Patent Application No. 10-2022-0052300 (9 pages in English, 5 pages in Korean).

\* cited by examiner

IMAGING LENS SYSTEM

CROSS-REFERENCE TO RELATED APPLICATION

This application claims the priority and benefit under 35 USC 119(a) of Korean Patent Application No. 10-2019-0071430, filed on Jun. 17, 2019 with the Korean Intellectual Property Office, the entire disclosure of which is incorporated herein by reference for all purposes.

BACKGROUND

The following description relates to an imaging lens system including seven lenses.

A compact camera may be mounted on a wireless terminal. For example, the compact camera may be mounted on a front surface and a rear surface thereof, respectively. Such a compact camera may be used for a variety of purposes such as outdoor scenery photography, indoor portrait photography and the like, such that performance that is not inferior to a general camera is required. However, it may be difficult to realize high performance because a small camera may be limited by a mounting space due to a size of a wireless terminal. Therefore, it is necessary to develop an imaging lens system capable of improving the performance of a compact camera without increasing the size of the compact camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, and a fifth lens, sequentially disposed at intervals from an object side of the imaging lens system. A refractive index of each of the second lens, the third lens, the fourth lens, and the fifth lens is 1.6 or greater and TTL/2IH<0.730, where TTL is a distance from an object side surface of the first lens to an imaging plane, and 2IH is a diagonal length of the imaging plane.

The first lens may have a concave shape on an image side surface.

The third lens may have a concave shape on an object side surface.

The third lens may have a convex shape on an image side surface.

The fourth lens may have a convex shape on an object side surface.

The fifth lens may have a concave shape on an object side surface.

The fifth lens may have negative refractive power.

The imaging lens system may satisfy TTL/2IH<0.613.

The imaging lens system may include a sixth lens disposed at intervals between the fifth lens and the imaging plane and having a positive refractive power.

The imaging lens system may include a seventh lens disposed at intervals between the sixth lens and the imaging plane and having a concave object side surface.

In another general aspect, an imaging lens system includes a first lens, a second lens, a third lens, a fourth lens, a fifth lens, a sixth lens, and a seventh lens, sequentially disposed at intervals from an object side of the imaging lens system, wherein TTL/2IH<0.613, where TTL is a distance from an object side surface of the first lens to an imaging plane, and 2IH is a diagonal length of the imaging plane.

The imaging lens system may satisfy 25<V1−V3<45, where V1 is an Abbe number of the first lens and V3 is an Abbe number of the third lens.

The imaging lens system may satisfy 25<V1−V4<45, where V1 is an Abbe number of the first lens and V4 is an Abbe number of the fourth lens.

The imaging lens system may satisfy 1.5<f3/f, where f is a focal length of the imaging lens system and f3 is a focal length of the third lens.

The imaging lens system may satisfy TTL/f<1.4, where f is a focal length of the imaging lens system.

In another general aspect, an imaging lens system includes a first lens, a second lens, a third lens, a fourth lens, a fifth lens, a sixth lens, and a seventh lens, sequentially disposed at intervals from an object side of the imaging lens system. The fifth lens has negative refractive power with a refractive index of 1.6 or greater, and TTL/2IH<0.730, where TTL is a distance from an object side surface of the first lens to an imaging plane, and 2IH is a diagonal length of the imaging plane.

A refractive power of the first lens may be greater than a refractive power of the sixth lens, and the refractive power of the sixth lens may be greater than a refractive power of the third lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
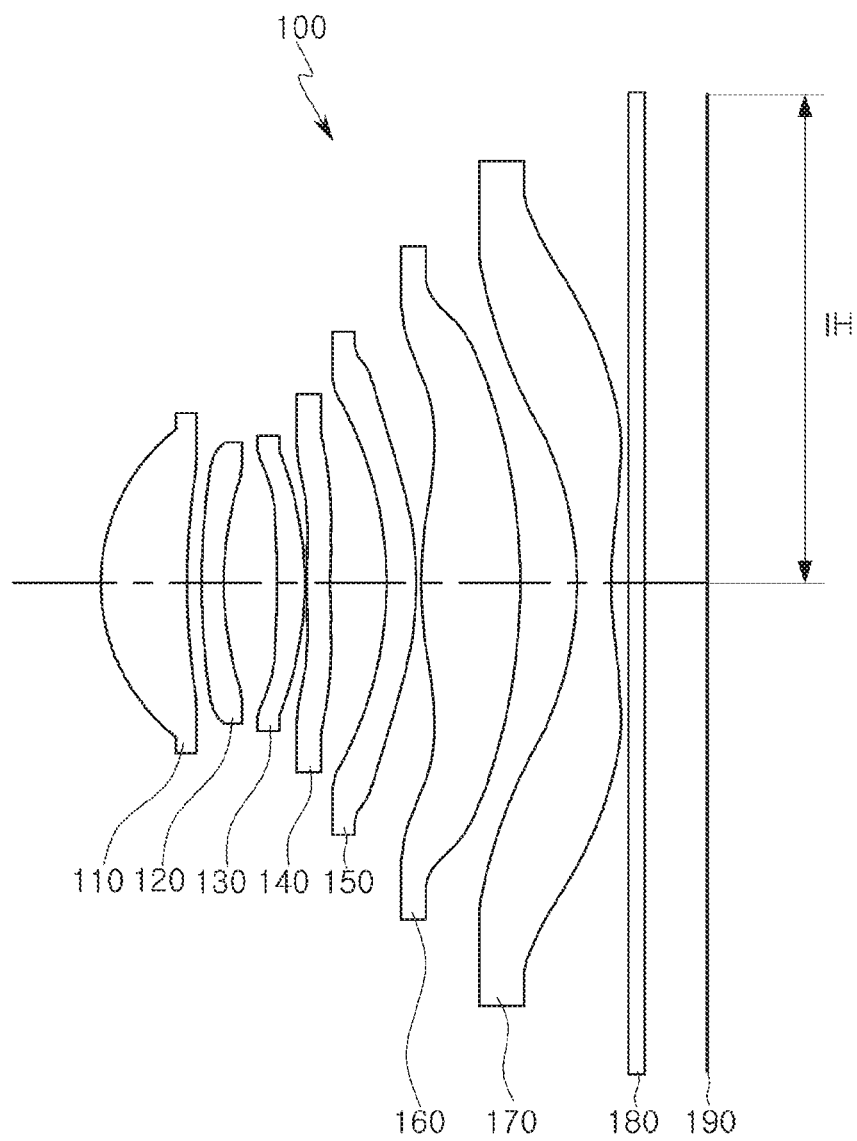
FIG. 1 is a configuration diagram of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, a first lens means a lens closest to an object (or a subject), and a seventh lens means a lens closest to an imaging plane (or an image sensor). Herein, a unit of a curvature of radius, a thickness, TTL (a distance from an object side surface of the first lens to the imaging plane), 2IH (a diagonal length of the imaging plane), IH (½ of 2HI), and a focal length of the lens may be in millimeters (mm).

The thickness of the lens, the distance between the lenses, and the TTL is a distance from an optical axis of the lens. In an explanation of a shape of each lens, a convex shape on one surface may mean that a paraxial region of the surface may be convex, and a concave shape of one surface may mean that a paraxial region of the surface may be concave. Therefore, even when one surface of the lens is described as having a convex shape, an edge portion of the lens may be concave. Similarly, even when one surface of the lens is described as having a concave shape, an edge portion of the lens may be convex.

The imaging lens system includes five or more lenses. For example, the imaging lens system includes a first lens, a second lens, a third lens, a fourth lens, and a fifth lens, sequentially disposed at intervals from an object side. The imaging lens system may further include a sixth lens disposed at intervals between the fifth lens and an imaging plane. In addition, the imaging lens system may further include a seventh lens disposed at intervals between the sixth lens and the imaging plane. Each lens does not contact an image side surface and an object side surface of a neighboring lens in the paraxial region. In addition, an F-number of the imaging lens system may be 2.0 or less.

The first lens has refractive power. For example, the first lens has positive refractive power. The first lens has a concave shape on one surface. For example, the first lens has a concave shape on an image side surface.

The first lens includes an aspherical surface. For example, both surfaces of the first lens may be aspherical. The first lens may be made of a material having high light transmittance and excellent workability. For example, the first lens may be made of a plastic material. The first lens has a low refractive index. For example, the refractive index of the first lens may be less than 1.6, or the refractive index of the first lens may be less than 1.55.

The second lens has refractive power. For example, the second lens may have negative refractive power. The second lens has a convex shape on one surface. For example, the second lens may have a convex shape on an object side surface.

The second lens includes an aspherical surface. For example, both surfaces of the second lens may be aspherical. The second lens may be made of a material having high light transmittance and excellent workability. For example, the second lens may be made of a plastic material. The second lens has a refractive index higher than the refractive index of the first lens. For example, the refractive index of the second lens may be 1.6 or greater. Additionally, the second lens may have a higher refractive index than the lower limit value described above. For example, the refractive index of the second lens may be 1.66 or greater.

The third lens has refractive power. For example, the third lens has positive refractive power. The third lens has a concave shape on one surface. For example, the third lens may have a concave shape on an object side surface. The third lens may have a convex shape on one surface. For example, the third lens may have a convex shape on an image side surface.

The third lens includes an aspherical surface. For example, both surfaces of the third lens may be aspherical. The third lens may be made of a material having high light transmittance and excellent workability. For example, the third lens may be made of a plastic material. The third lens has a higher refractive index than the refractive index of the first lens. For example, the refractive index of the third lens may be 1.6 or greater. Additionally, the third lens may have a higher refractive index than the lower limit value described above. For example, the refractive index of the third lens may be 1.64 or greater.

The fourth lens has refractive power. For example, the fourth lens has negative refractive power. The fourth lens has a convex shape on one surface. For example, the fourth lens may have a convex shape on an object side surface.

The fourth lens includes an aspherical surface. For example, both surfaces of the fourth lens may be aspherical. The fourth lens may be made of a material having high light transmittance and excellent workability. For example, the fourth lens may be made of a plastic material. The fourth lens has a higher refractive index than the refractive index of the first lens. For example, the refractive index of the fourth lens may be 1.6 or greater. Additionally, the fourth lens may have a higher refractive index than the lower limit value described above. For example, the refractive index of the fourth lens may be 1.66 or greater.

The fifth lens has refractive power. For example, the fifth lens may have negative refractive power. The fifth lens has a concave shape on one surface. For example, the fifth lens may have a concave shape on an object side surface.

The fifth lens includes an aspherical surface. For example, both surfaces of the fifth lens may be aspherical. The fifth lens may be made of a material having high light transmittance and excellent workability. For example, the fifth lens may be made of a plastic material. The fifth lens has a higher refractive index than the refractive index of the first lens. For example, the refractive index of the fifth lens may be 1.6 or greater. Additionally, the fifth lens may have a higher refractive index than the lower limit value described above. For example, the refractive index of the fifth lens may be 1.64 or greater.

The sixth lens has refractive power. For example, the sixth lens has positive refractive power. The sixth lens has a convex shape on one surface. For example, the sixth lens may have a convex shape on an object side surface. The sixth lens may have a shape having an inflection point. For example, an inflection point may be formed on at least one of the object side surface and the image side surface of the sixth lens.

The sixth lens includes an aspherical surface. For example, both surfaces of the sixth lens may be aspherical. The sixth lens may be made of a material having high light transmittance and excellent workability. For example, the sixth lens may be made of a plastic material. The sixth lens has a refractive index substantially similar to the refractive index of the first lens. For example, the refractive index of the sixth lens may be less than 1.6.

The seventh lens has refractive power. For example, the seventh lens has negative refractive power. The seventh lens may have a concave shape on one surface. For example, the seventh lens may have a concave shape on an object side surface. The seventh lens may have a shape having an inflection point. For example, one or more inflection points may be formed on at least one of the object side surface and the image side surface of the seventh lens.

The seventh lens includes an aspherical surface. For example, both surfaces of the seventh lens may be aspherical. The seventh lens may be made of a material having high light transmittance and excellent workability. For example, the seventh lens may be made of a plastic material. The seventh lens has a refractive index substantially similar to the refractive index of the sixth lens. For example, the refractive index of the seventh lens may be less than 0.6.

The first to seventh lenses include aspherical surfaces as described above. The aspherical surfaces of the first to seventh lenses may be represented by the following Equation 1.

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Equation 1

In Equation 1, c is a reciprocal of a radius of curvature of the lens, k is a conic constant, r is a distance from any point on an aspherical surface to an optical axis, A through J are aspherical surface constants, and Z (or SAG) is a height in an optical axis direction from any point on an aspheric surface to an apex of the aspheric surface.

The imaging lens system further includes a filter, an image sensor, and a stop.

The filter is disposed between the seventh lens and the image sensor. The filter may block some wavelengths of light. For example, the filter may block infrared light wavelengths. The image sensor forms an imaging plane on which light refracted through the first lens to the seventh lens may be formed. The image sensor converts an optical signal into an electrical signal. For example, the image sensor may convert an optical signal incident on the imaging plane into an electrical signal. The stop is disposed to adjust an amount of light incident on the lens. For example, the stop may be disposed between the first lens and the second lens or disposed between the second lens and the third lens.

The imaging lens system may satisfy at least one of the following conditional expressions.

$0 < f1/f < 2.0$            Conditional Expression 1:

$25 < V1 - V2 < 45$            Conditional Expression 2:

$25 < V1 - V3 < 45$            Conditional Expression 3:

$25 < V1 - V4 < 45$            Conditional Expression 4:

$25 < V1 - V5 < 45$            Conditional Expression 5:

$-3.5 < f2/f < 0$            Conditional Expression 6:

$1.5 < f3/f$            Conditional Expression 7:

$f4/f < 0$            Conditional Expression 8:

| | |
|---|---|
| $f5/f<0$ | Conditional Expression 9: |
| $0<f6/f$ | Conditional Expression 10: |
| $f7/f<0$ | Conditional Expression 11: |
| $TTL/f<1.4$ | Conditional Expression 12: |
| $-1.0<f1/f2<0$ | Conditional Expression 13: |
| $-2.0<f2/f3<0$ | Conditional Expression 14: |
| $BFL/f<0.4$ | Conditional Expression 15: |
| $D12/f<0.1$ | Conditional Expression 16: |
| $SD5/IH<0.6$ | Conditional Expression 17: |
| $0.7<SD6/IH$ | Conditional Expression 18: |
| $0.8<SD7/IH$ | Conditional Expression 19: |
| $TTL/2IH<0.730$ | Conditional Expression 20: |

The imaging lens system may satisfy all the following conditional expressions.

| | |
|---|---|
| $1.6 \leq Nd2$ | Conditional Expression 21: |
| $1.6 \leq Nd3$ | Conditional Expression 22: |
| $1.6 \leq Nd4$ | Conditional Expression 23: |
| $1.6 \leq Nd5$ | Conditional Expression 24: |

Further, the imaging lens system may satisfy the following conditional expression.

| | |
|---|---|
| $TTL/2HI<0.613$ | Conditional Expression 25: |

In the imaging lens system, the refractive power of the first lens is higher than the refractive power of the sixth lens, and the refractive power of the sixth lens is higher than the refractive power of the third lens. For example, the first lens, the third lens, and the sixth lens may satisfy the following conditions.

| | |
|---|---|
| $1/f3<1/f6<1/f1$ | Conditional Expression 26: |

In the conditional expressions, f is a focal length of the imaging lens system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, V1 is an Abbe number of the first lens, V2 is an Abbe number of the second lens, V3 is an Abbe number of the third lens, V4 is an Abbe number of the fourth lens, V5 is an Abbe number of the fifth lens, TTL is a distance from an object side surface of the first lens to an imaging plane, BFL is a distance from an image side surface of the seventh lens to the imaging plane, D12 is a distance from the image side surface of the first lens to an object side surface of the second lens, SD5 is an effective radius of the fifth lens, SD6 is an effective radius of the sixth lens, and SD7 is an effective radius of the seventh lens, Nd2 is a refractive index of the second lens, Nd3 is a refractive index of the third lens, Nd4 is a refractive index of the fourth lens, and Nd5 is a refractive index of the fifth lens.

Conditional expression 1 is a condition for limiting appropriate refractive power of the first lens. A first lens that is outside of a numerical range of the conditional expression increases a focal length of the imaging lens system, making miniaturization of the imaging lens system difficult. Conditional expressions 2 to 5 are conditions for reducing chromatic aberrations of the imaging lens system. Conditional expressions 6 to 11 are conditions for limiting appropriate refractive power of the second lens to the seventh lens, respectively. A lens that is outside of the numerical range of the conditional expressions has too high or too low to correct aberrations through each lens. Conditional expressions 12 and 15 are conditions for miniaturization of the imaging lens system. The imaging lens system that is outside of the upper limit value of the conditional expression is not suitable for a portable terminal because the distance from the object side surface of the first lens to the imaging plane is outside of the range that can be mounted on the portable terminal or the focal length of the imaging lens system is too short. Conditional expressions 13 and 14 are conditions for limiting an appropriate focal length of the first lens to the third lens. A lens that is outside of the numerical range of the conditional expression may cause aberration characteristics to deteriorate because the refractive power thereof may be too high. Conditional expression 16 is a condition for reducing chromatic aberrations through the first lens and the second lens. For example, if a distance between the first lens and the second lens is outside of the upper limit value of the conditional expression, it is difficult to improve the longitudinal chromatic aberration according to Abbe number deviation of the first lens and the second lens. Conditional expressions 17 to 19 are conditions for reducing a flare phenomenon. If effective radii of the fifth lens to the seventh lens are outside of the upper limit value or the lower limit value of the conditional expression, a sweep angle of each lens becomes wider, such that flare characteristics may be deteriorated.

An imaging lens system according to a first example will be described with reference to FIG. 1.

An imaging lens system 100 includes a first lens 110, a second lens 120, a third lens 130, a fourth lens 140, a fifth lens 150, a sixth lens 160, and a seventh lens 170.

The first lens 110 has positive refractive power, and the first lens 110 has a convex shape on an object side surface and a concave shape on an image side surface. The second lens 120 has negative refractive power, and the second lens 120 has a convex shape on an object side surface and a concave shape on an image side surface. The third lens 130 has positive refractive power, and the third lens 130 has a concave shape on an object side surface and a convex shape on an image side surface. The fourth lens 140 has negative refractive power, and the fourth lens 140 has a convex shape on an object side surface and a concave shape on an image side surface. The fifth lens 150 has negative refractive power, and the fifth lens 150 has a concave shape on an object side surface and a convex shape on an image side surface. The sixth lens 160 has positive refractive power, and the sixth lens 160 has a convex shape on an object side surface and a convex shape on an image side surface. Further, the sixth lens 160 has a shape in which an inflection point is formed on the object side surface and the image side surface. The seventh lens 170 has negative refractive power, and the seventh lens 170 has a concave shape on an object side surface and a concave shape on an image side surface. Further, the seventh lens 170 has a shape in which an inflection point is formed on the object side surface and the image side surface.

The imaging lens system 100 further includes a filter 180 and an image sensor 190. The filter 180 is disposed between the seventh lens 170 and the image sensor 190. For reference, although not shown in the drawings, a stop may be disposed between the second lens 120 and the third lens 130.

Figure 2:
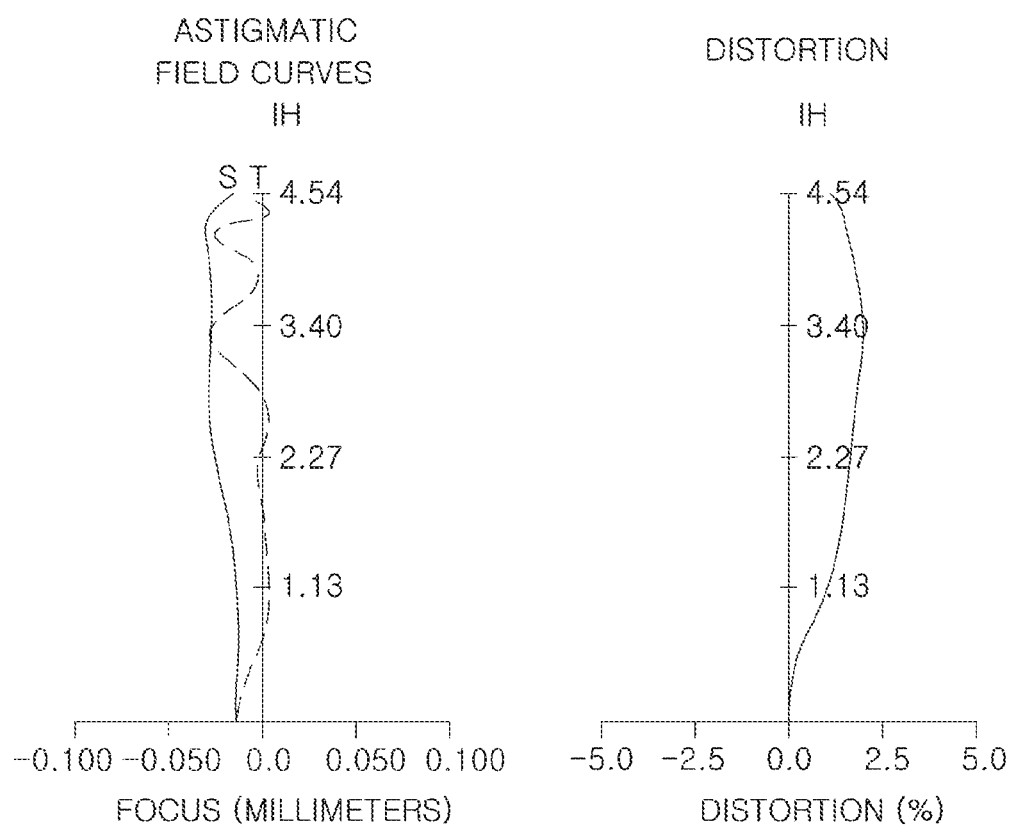
FIG. 2 illustrates aberration curves of the imaging lens system illustrated in FIG. 1.

The imaging lens system 100 illustrates aberration characteristics as shown in FIG. 2. Tables 1 and 2 represent lens characteristics and aspherical surface values of the imaging lens system 100.

TABLE 1

| Surface number | Reference | Radius of curvature | Thickness/ distance | Refractive index | Abbe number |
|---|---|---|---|---|---|
| S1 | First lens | 1.91 | 0.861 | 1.544 | 56.1 |
| S2 |  | 7.32 | 0.138 |  |  |
| S3 | Second lens | 14.62 | 0.200 | 1.680 | 18.4 |
| S4 |  | 5.49 | 0.541 |  |  |
| S5 | Third lens | −12.85 | 0.269 | 1.646 | 23.5 |
| S6 |  | −4.23 | 0.026 |  |  |
| S7 | Fourth lens | 34.70 | 0.230 | 1.680 | 18.4 |
| S8 |  | 6.64 | 0.591 |  |  |
| S9 | Fifth lens | −1.92 | 0.280 | 1.641 | 23.9 |
| S10 |  | −2.47 | 0.025 |  |  |
| S11 | Sixth lens | 3.35 | 0.822 | 1.544 | 56.1 |
| S12 |  | −12.70 | 0.746 |  |  |
| S13 | Seventh lens | −6.45 | 0.330 | 1.544 | 56.1 |
| S14 |  | 3.37 | 0.181 |  |  |
| S15 | Filter | Infinity | 0.110 | 1.514 | 64.1 |
| S16 |  | Infinity | 0.635 |  |  |
| Imaging plane | Imaging plane | Infinity | 0.015 |  |  |

TABLE 2

| Ex. 1 | K | A | B | C | D | E | F | G | H | J |
|---|---|---|---|---|---|---|---|---|---|---|
| S1 | −0.2447 | 0.0058 | −0.0067 | 0.0412 | −0.0897 | 0.1106 | −0.081 | 0.0349 | −0.0082 | 0.0008 |
| S2 | −9.1953 | 0.0037 | −0.0197 | 0.0497 | −0.0837 | 0.0883 | −0.059 | 0.024 | −0.0054 | 0.0005 |
| S3 | −15.41 | 0.0166 | −0.0341 | 0.1326 | −0.2989 | 0.4305 | −0.389 | 0.2146 | −0.0659 | 0.0086 |
| S4 | 14.167 | 0.0276 | −0.0905 | 0.4287 | −1.1938 | 2.0873 | −2.2897 | 1.5351 | −0.5749 | 0.0925 |
| S5 | 92.938 | 0.013 | −0.0052 | −0.142 | 0.29 | −0.333 | 0.1948 | −0.0346 | −0.0146 | 0.0059 |
| S6 | −24.378 | 0.1843 | −0.6666 | 1.2126 | −1.5604 | 1.3633 | −0.7951 | 0.3041 | −0.0701 | 0.0075 |
| S7 | −99 | 0.1328 | −0.6515 | 1.1954 | −1.4881 | 1.2515 | −0.6719 | 0.2192 | −0.0396 | 0.003 |
| S8 | −75.47 | −0.0195 | −0.0756 | 0.0924 | −0.0886 | 0.0707 | −0.0389 | 0.0134 | −0.0026 | 0.0002 |
| S9 | −4.9231 | 0.0886 | −0.1076 | 0.1044 | −0.0688 | 0.0302 | −0.0097 | 0.0022 | −0.0003 | 2E−05 |
| S10 | −1.9842 | 0.0499 | −0.0732 | 0.0673 | −0.0227 | −0.0017 | 0.0034 | −0.001 | 0.0001 | −6E−06 |
| S11 | −1.9842 | 0.0499 | −0.0732 | 0.0673 | −0.0227 | −0.0017 | 0.0034 | −0.001 | 0.0001 | −6E−06 |
| S12 | −91.63 | 0.0532 | −0.0425 | 0.0135 | −0.0014 | −0.0004 | 0.0002 | −3E−05 | 2E−06 | −5E−08 |
| S13 | 0.8052 | −0.0411 | −0.0012 | 0.0042 | −0.0008 | 6E−05 | −2E−08 | −3E−07 | 2E−08 | −3E−10 |
| S14 | −13.423 | −0.0444 | 0.0069 | −0.0001 | −0.0002 | 5E−05 | −6E−06 | 4E−07 | −1E−08 | 2E−10 |

Figure 3:
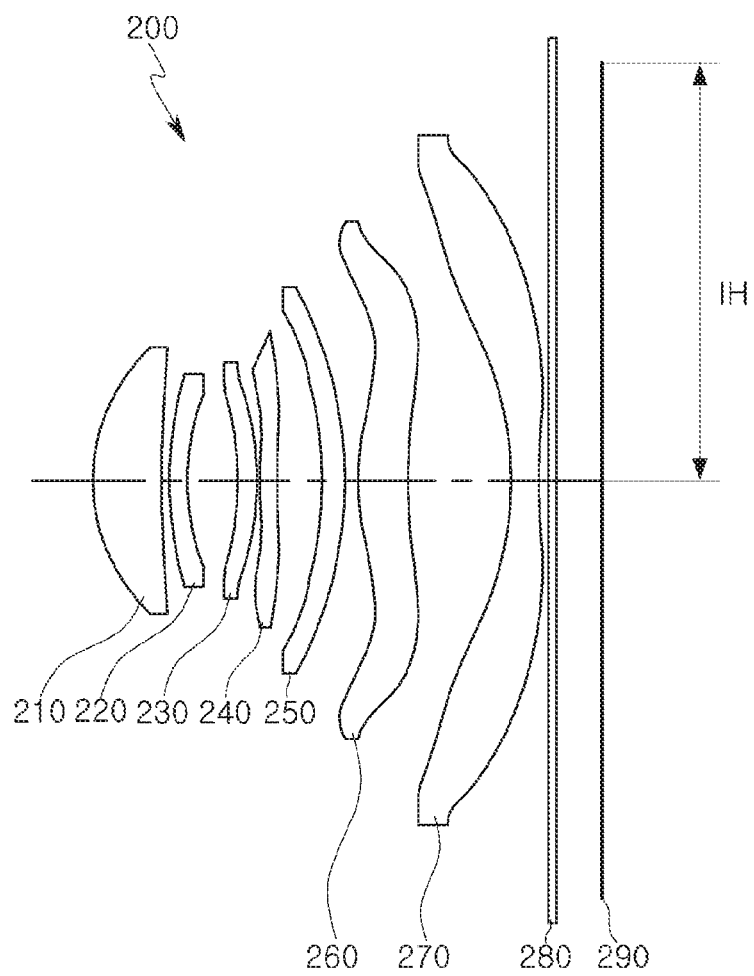
FIG. 3 is a configuration diagram of an imaging lens system according to a second example.

An imaging lens system according to a second example will be described with reference to FIG. 3.

An imaging lens system 200 includes a first lens 210, a second lens 220, a third lens 230, a fourth lens 240, a fifth lens 250, a sixth lens 260, and a seventh lens 270.

The first lens 210 has positive refractive power, and the first lens 210 has a convex shape on an object side surface and a concave shape on an image side surface. The second lens 220 has negative refractive power, and the second lens 220 has a convex shape on an object side surface and a concave shape on an image side surface. The third lens 230 has positive refractive power, and the third lens 230 has a concave shape on an object side surface and a convex shape on an image side surface. The fourth lens 240 has negative refractive power, and the fourth lens 240 has a convex shape on an object side surface and a concave shape on an image side surface. The fifth lens 250 has negative refractive power, and the fifth lens 250 has a concave shape on an object side surface and a convex shape on an image side surface. The sixth lens 260 has positive refractive power, and the sixth lens 260 has a convex shape on an object side surface and a concave shape on an image side surface. Further, the sixth lens 260 has a shape in which an inflection point is formed on the object side surface and the image side surface. The seventh lens 270 has negative refractive power, and the seventh lens 270 has a concave shape on an object side surface and a concave shape on an image side surface. Further, the seventh lens 270 has a shape in which an inflection point is formed on the object side surface and the image side surface.

The imaging lens system 200 further includes a filter 280 and an image sensor 290. The filter 280 is disposed between the seventh lens 270 and the image sensor 290. For reference, although not shown in the drawings, a stop may be disposed between the second lens 220 and the third lens 230.

Figure 4:
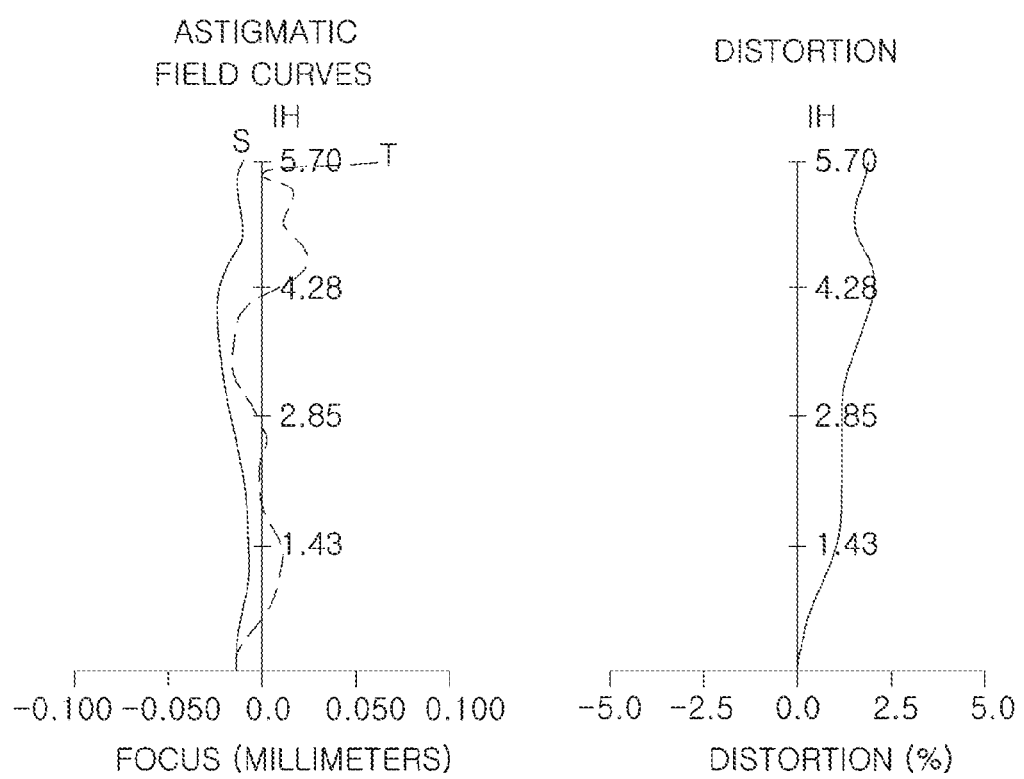
FIG. 4 illustrates aberration curves of the imaging lens system illustrated in FIG. 3.

The imaging lens system 200 illustrates aberration characteristics as shown in FIG. 4. Tables 3 and 4 illustrate lens characteristics and aspherical surface values of the imaging lens system 200.

TABLE 3

| Surface number | Reference | Radius of curvature | Thickness/ distance | Refractive index | Abbe number |
|---|---|---|---|---|---|
| S1 | First lens | 2.22 | 0.981 | 1.544 | 56.1 |
| S2 |  | 8.59 | 0.107 |  |  |
| S3 | Second lens | 12.75 | 0.230 | 1.661 | 19.2 |
| S4 |  | 5.32 | 0.688 |  |  |
| S5 | Third lens | −14.72 | 0.289 | 1.667 | 20.4 |
| S6 |  | −4.69 | 0.046 |  |  |
| S7 | Fourth lens | 68.16 | 0.230 | 1.661 | 19.2 |
| S8 |  | 6.21 | 0.646 |  |  |
| S9 | Fifth lens | −2.69 | 0.300 | 1.646 | 23.5 |
| S10 |  | −3.32 | 0.179 |  |  |
| S11 | Sixth lens | 2.96 | 0.712 | 1.544 | 56.1 |
| S12 |  | 9.11 | 1.446 |  |  |
| S13 | Seventh lens | −8.28 | 0.351 | 1.544 | 56.1 |
| S14 |  | 5.30 | 0.135 |  |  |
| S15 | Filter | Infinity | 0.110 | 1.514 | 64.2 |
| S16 |  | Infinity | 0.635 |  |  |
| Imaging plane | Imaging plane | Infinity | 0.015 |  |  |

TABLE 4

| Ex. 2 | K | A | B | C | D | E | F | G | H | J |
|---|---|---|---|---|---|---|---|---|---|---|
| S1 | −0.4525 | 0.0027 | 0.0099 | −0.0186 | 0.0222 | −0.0165 | 0.0076 | −0.0021 | 0.0003 | −2E−05 |
| S2 | −41.891 | −0.0022 | −0.0064 | 0.0082 | −0.0056 | 0.0024 | −0.001 | 0.0004 | −0.0001 | 1E−05 |
| S3 | 63.654 | 9E−05 | −0.002 | 0.0232 | −0.0421 | 0.0514 | −0.0407 | 0.0198 | −0.0053 | 0.0006 |
| S4 | 14.456 | 0.0107 | −0.002 | −0.0192 | 0.1105 | −0.2211 | 0.234 | −0.1404 | 0.0453 | −0.0062 |
| S5 | 83.568 | 0.0039 | 0.0085 | −0.101 | 0.2189 | −0.29 | 0.2375 | −0.1184 | 0.0329 | −0.0039 |
| S6 | −15.095 | 0.1131 | −0.311 | 0.4354 | −0.4045 | 0.2337 | −0.0779 | 0.0115 | 0.0005 | −0.0003 |
| S7 | −55.609 | 0.0812 | −0.3482 | 0.4991 | −0.4572 | 0.2756 | −0.1058 | 0.0248 | −0.0032 | 0.0002 |
| S8 | −95.371 | 0.0178 | −0.1058 | 0.1173 | −0.0842 | 0.041 | −0.0131 | 0.0026 | −0.0003 | 1E−05 |
| S9 | −5.8871 | 0.0601 | −0.0599 | 0.0554 | −0.0349 | 0.0141 | −0.0037 | 0.0006 | −6E−05 | 2E−06 |
| S10 | −1.7925 | 0.0152 | −0.02 | 0.0234 | −0.0119 | 0.0033 | −0.0006 | 6E−05 | −4E−06 | 1E−07 |
| S11 | −9.5869 | −0.0099 | −0.0006 | 1E−05 | 5E−05 | −4E−05 | 1E−05 | −1E−06 | 6E−08 | −1E−09 |
| S12 | −45.48 | 0.0234 | −0.0182 | 0.0071 | −0.0019 | 0.0004 | −4E−05 | 3E−06 | −1E−07 | 3E−09 |
| S13 | 1.0233 | −0.038 | 0.0111 | −0.0025 | 0.0005 | −6E−05 | 5E−06 | −2E−07 | 6E−09 | −6E−11 |
| S14 | −19.881 | −0.0296 | 0.0061 | −0.0011 | 0.0001 | −9E−06 | 3E−07 | 2E−09 | −3E−10 | 4E−12 |

Figure 5:
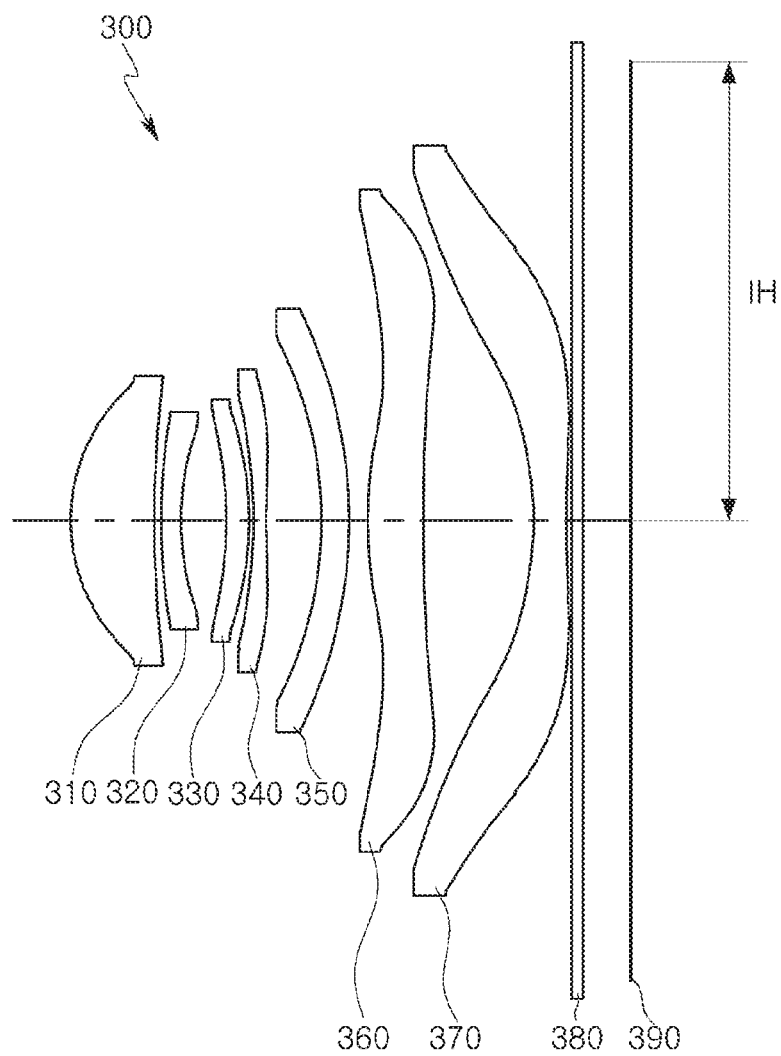
FIG. 5 is a configuration diagram of an imaging lens system according to a third example.

An imaging lens system according to a third example will be described with reference to FIG. 5.

An imaging lens system 300 includes a first lens 310, a second lens 320, a third lens 330, a fourth lens 340, a fifth lens 350, a sixth lens 360, and a seventh lens 370.

The first lens 310 has positive refractive power, and the first lens 310 has a convex shape on an object side surface and a concave shape on an image side surface. The second lens 320 has negative refractive power, and the second lens 320 has a convex shape on an object side surface and a concave shape on an image side surface. The third lens 330 has positive refractive power, and the third lens 330 has a concave shape on an object side surface and a convex shape on an image side surface. The fourth lens 340 has negative refractive power, and the fourth lens 340 has a concave shape on an object side surface and a concave shape on an image side surface. The fifth lens 350 has negative refractive power, and the fifth lens 350 has a concave shape on an object side surface and a convex shape on an image side surface. The sixth lens 360 has positive refractive power, and the sixth lens 360 has a convex shape on an object side surface and a concave shape on an image side surface. Further, the sixth lens 360 has a shape in which an inflection point is formed on the object side surface and the image side surface. The seventh lens 370 has negative refractive power, and the seventh lens 370 has a concave shape on an object side surface and a concave shape on an image side surface. Further, the seventh lens 370 has a shape in which an inflection point is formed on the object side surface and the image side surface.

The imaging lens system 300 further includes a filter 380 and an image sensor 390. The filter 380 is disposed between the seventh lens 370 and the image sensor 390. For reference, although not shown in the drawings, a stop may be disposed between the second lens 320 and the third lens 330.

Figure 6:
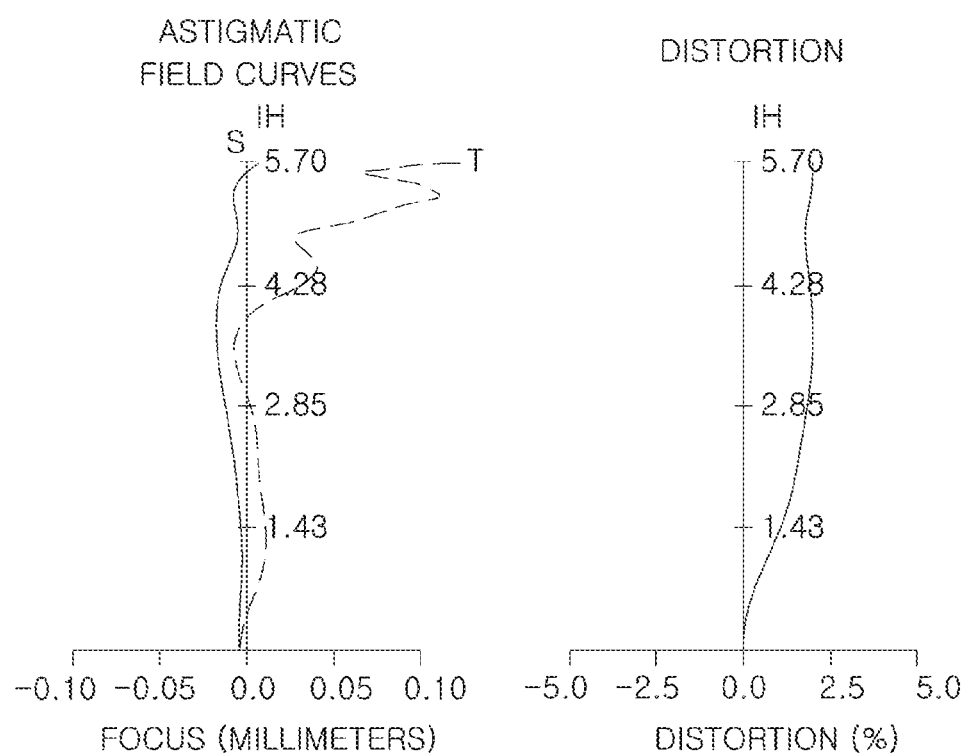
FIG. 6 illustrates aberration curves of the imaging lens system illustrated in FIG. 5.

The imaging lens system 300 illustrates aberration characteristics as shown in FIG. 6. Tables 5 and 6 illustrate lens characteristics and aspherical surface values of the imaging lens system 300.

TABLE 5

| Surface number | Reference | Radius of curvature | Thickness/distance | Refractive index | Abbe number |
|---|---|---|---|---|---|
| S1 | First lens | 2.25 | 1.047 | 1.544 | 56.1 |
| S2 | | 9.03 | 0.108 | | |
| S3 | Second lens | 16.17 | 0.238 | 1.680 | 18.4 |
| S4 | | 5.83 | 0.568 | | |
| S5 | Third lens | −14.23 | 0.296 | 1.646 | 23.5 |
| S6 | | −5.55 | 0.025 | | |
| S7 | Fourth lens | −38.28 | 0.230 | 1.680 | 19.2 |
| S8 | | 15.50 | 0.713 | | |
| S9 | Fifth lens | −3.36 | 0.300 | 1.615 | 26.0 |
| S10 | | −4.29 | 0.163 | | |
| S11 | Sixth lens | 3.33 | 0.768 | 1.544 | 56.1 |
| S12 | | 11.73 | 1.403 | | |
| S13 | Seventh lens | −6.49 | 0.390 | 1.544 | 55.7 |
| S14 | | 5.52 | 0.090 | | |
| S15 | Filter | Infinity | 0.110 | 1.514 | 64.2 |
| S16 | | Infinity | 0.646 | | |
| Imaging plane | Imaging plane | Infinity | 0.004 | | |

TABLE 6

| Ex. 3 | K | A | B | C | D | E | F | G | H | J |
|---|---|---|---|---|---|---|---|---|---|---|
| S1 | −0.2915 | 0.0019 | 0.0066 | −0.012 | 0.014 | −0.0099 | 0.0043 | −0.0011 | 0.0001 | −8E−06 |
| S2 | −34.068 | −0.0035 | −0.0059 | 0.0095 | −0.0025 | −0.0035 | 0.0033 | −0.0012 | 0.0002 | −2E−05 |
| S3 | 81.964 | 0.0023 | −0.0135 | 0.0418 | −0.0396 | 0.0166 | 0.0014 | −0.0047 | 0.002 | −0.0003 |
| S4 | 13.788 | 0.0088 | 0.0156 | −0.0775 | 0.2341 | −0.3769 | 0.3549 | −0.1969 | 0.0598 | −0.0076 |
| S5 | 79.525 | −0.0048 | 0.0324 | −0.1768 | 0.3842 | −0.5024 | 0.3989 | −0.1882 | 0.0479 | −0.005 |
| S6 | −20.722 | 0.1375 | −0.4375 | 0.6676 | −0.6361 | 0.3642 | −0.1127 | 0.0114 | 0.0025 | −0.0006 |
| S7 | 78.508 | 0.1231 | −0.4838 | 0.7515 | −0.7423 | 0.4785 | −0.1955 | 0.0484 | −0.0066 | 0.0004 |
| S8 | −96.165 | −0.0123 | −0.0715 | 0.0814 | −0.0571 | 0.0274 | −0.0086 | 0.0018 | −0.0002 | 2E−05 |
| S9 | −3.2358 | 0.0565 | −0.0501 | 0.032 | −0.0154 | 0.005 | −0.0011 | 0.0002 | −1E−05 | 5E−07 |
| S10 | −0.5784 | 0.0119 | −0.0185 | 0.0149 | −0.0054 | 0.0009 | −2E−05 | −1E−05 | 2E−06 | −9E−08 |
| S11 | −10.652 | −0.0029 | −0.0073 | 0.0032 | −0.0007 | 8E−05 | −6E−06 | 3E−07 | −7E−09 | 8E−11 |
| S12 | −10.97 | 0.0199 | −0.0142 | 0.004 | −0.0006 | 7E−05 | −4E−06 | 2E−07 | −4E−09 | 4E−11 |
| S13 | −0.2065 | −0.0313 | 0.0082 | −0.0018 | 0.0004 | −4E−05 | 3E−06 | −1E−07 | 3E−09 | −3E−11 |
| S14 | −29.868 | −0.0213 | 0.0038 | −0.0008 | 0.0001 | −1E−05 | 1E−06 | −4E−08 | 9E−10 | −8E−12 |

Figure 7:
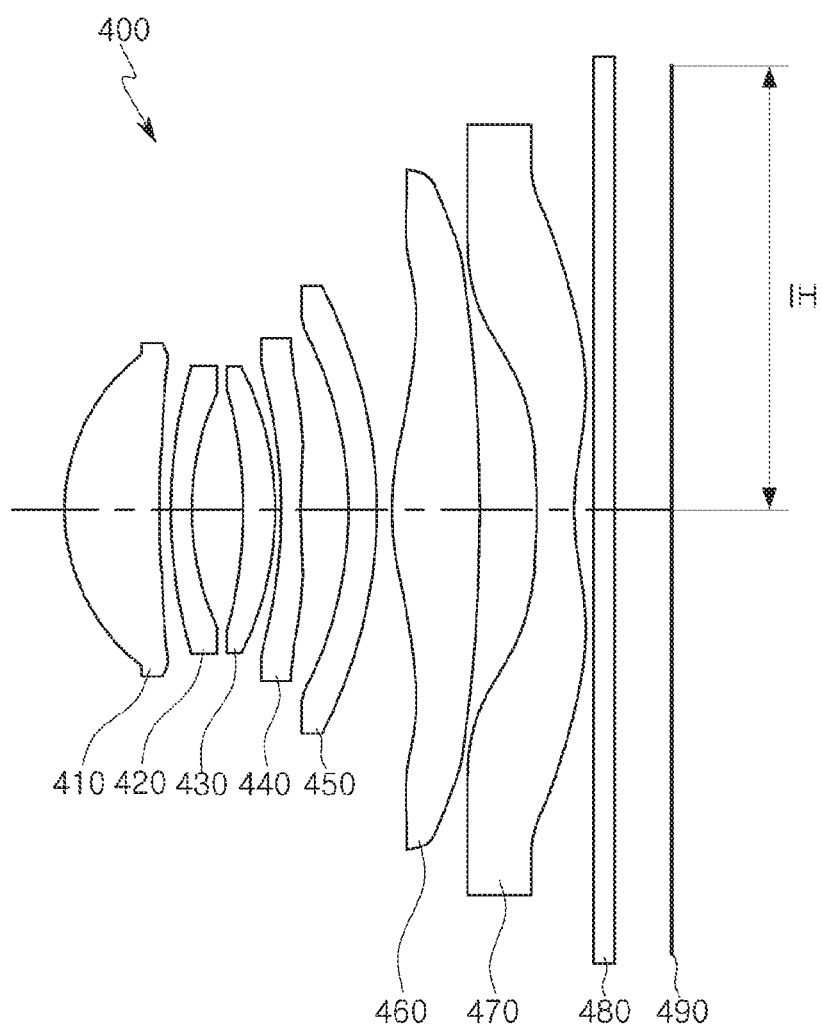
FIG. 7 is a configuration diagram of an imaging lens system according to a fourth example.

An imaging lens system according to a fourth example will be described with reference to FIG. 7.

An imaging lens system 400 includes a first lens 410, a second lens 420, a third lens 430, a fourth lens 440, a fifth lens 450, a sixth lens 460, and a seventh lens 470.

The first lens 410 has positive refractive power, and the first lens 410 has a convex shape on an object side surface and a concave shape on an image side surface. The second lens 420 has negative refractive power, and the second lens 420 has a convex shape on an object side surface and a concave shape on an image side surface. The third lens 430 has positive refractive power, and the third lens 430 has a concave shape on an object side surface and a convex shape on an image side surface. The fourth lens 440 has negative refractive power, and the fourth lens 440 has a concave shape on an object side surface and a concave shape on an image side surface. The fifth lens 450 has negative refractive power, and the fifth lens 450 has a convex shape on an object side surface and a convex shape on an image side surface. The sixth lens 460 has positive refractive power, and the sixth lens 460 has a convex shape on an object side surface and a convex shape on an image side surface. Further, the sixth lens 460 has a shape in which an inflection point is formed on the object side surface and the image side surface. The seventh lens 470 has negative refractive power, and the seventh lens 470 has a concave shape on an object side surface and a concave shape on an image side surface. Further, the seventh lens 470 has a shape in which an inflection point is formed on the object side surface and the image side surface.

The imaging lens system 400 further includes a filter 480 and an image sensor 490. The filter 480 is disposed between the seventh lens 470 and the image sensor 490. For reference, although not shown in the drawings, a stop may be disposed between the second lens 420 and the third lens 430.

Figure 8:
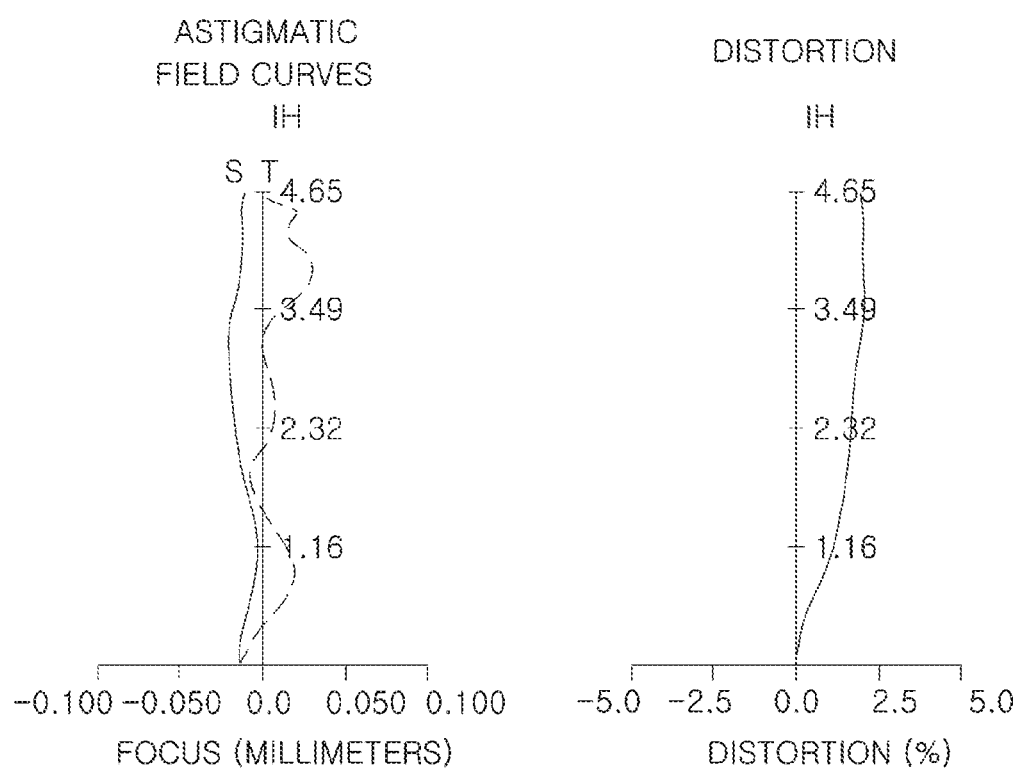
FIG. 8 illustrates aberration curves of the imaging lens system illustrated in FIG. 7.

The imaging lens system 400 illustrates aberration characteristics as shown in FIG. 8. Tables 7 and 8 illustrate lens characteristics and aspherical surface values of the imaging lens system 400.

TABLE 7

| Surface number | Reference | Radius of curvature | Thickness/ distance | Refractive index | Abbe number |
|---|---|---|---|---|---|
| S1 | First lens | 2.13 | 1.025 | 1.544 | 56.1 |
| S2 |  | 10.48 | 0.157 |  |  |
| S3 | Second lens | 19.95 | 0.230 | 1.671 | 19.3 |
| S4 |  | 5.44 | 0.556 |  |  |
| S5 | Third lens | −14.09 | 0.340 | 1.646 | 23.5 |
| S6 |  | −4.38 | 0.057 |  |  |
| S7 | Fourth lens | −22.99 | 0.270 | 1.671 | 19.3 |
| S8 |  | 15.23 | 0.485 |  |  |
| S9 | Fifth lens | −2.78 | 0.320 | 1.646 | 23.5 |
| S10 |  | −4.42 | 0.182 |  |  |
| S11 | Sixth lens | 3.06 | 0.825 | 1.544 | 56.1 |
| S12 |  | −25.36 | 0.781 |  |  |
| S13 | Seventh lens | −12.68 | 0.400 | 1.544 | 56.1 |
| S14 |  | 3.06 | 0.211 |  |  |
| S15 | Filter | Infinity | 0.210 | 1.514 | 64.2 |
| S16 |  | Infinity | 0.635 |  |  |
| Imaging plane | Imaging plane | Infinity | 0.015 |  |  |

TABLE 8

| Ex. 4 | K | A | B | C | D | E | F | G | H | J |
|---|---|---|---|---|---|---|---|---|---|---|
| S1 | −0.2187 | 0.0033 | 0.0001 | 0.0056 | −0.0107 | 0.0109 | −0.0065 | 0.0022 | −0.0004 | 3E−05 |
| S2 | −34.68 | 0.0004 | 0.0033 | −0.0108 | 0.0173 | −0.0164 | 0.0095 | −0.0033 | 0.0006 | −5E−05 |
| S3 | 78.603 | 0.0065 | −0.0213 | 0.0667 | −0.1032 | 0.1017 | −0.0636 | 0.0245 | −0.0053 | 0.0005 |
| S4 | 11.829 | 0.0159 | −0.0605 | 0.2083 | −0.4195 | 0.5505 | −0.4672 | 0.248 | −0.0748 | 0.0098 |
| S5 | 94.582 | 0.0108 | −0.0892 | 0.1891 | −0.3568 | 0.4679 | −0.4118 | 0.2277 | −0.0704 | 0.0092 |
| S6 | −11.139 | 0.1544 | −0.5625 | 0.9476 | −1.0696 | 0.8178 | −0.421 | 0.1416 | −0.0283 | 0.0025 |
| S7 | 98.995 | 0.1543 | −0.5864 | 0.8753 | −0.8369 | 0.5338 | −0.2198 | 0.0554 | −0.0077 | 0.0005 |
| S8 | −99 | 0.0299 | −0.1663 | 0.1968 | −0.1502 | 0.0793 | −0.0287 | 0.0069 | −0.001 | 6E−05 |
| S9 | −4.106 | 0.072 | −0.0832 | 0.0788 | −0.0526 | 0.023 | −0.0069 | 0.0014 | −0.0002 | 9E−06 |
| S10 | −0.3975 | 0.003 | −0.0296 | 0.0448 | −0.0273 | 0.009 | −0.0018 | 0.0002 | −1E−05 | 3E−07 |
| S11 | −9.2356 | −0.0143 | −0.0038 | 0.0045 | −0.0017 | 0.0003 | −3E−05 | 2E−06 | −7E−08 | 1E−09 |
| S12 | −99 | 0.0427 | −0.0349 | 0.0135 | −0.0031 | 0.0005 | −5E−05 | 3E−06 | −9E−08 | 1E−09 |
| S13 | 2.705 | −0.0577 | 0.0089 | −0.0012 | 0.0007 | −0.0002 | 2E−05 | −2E−06 | 6E−08 | −8E−10 |
| S14 | −8.3478 | −0.0506 | 0.013 | −0.0027 | 0.0005 | −6E−05 | 4E−06 | −2E−07 | 5E−09 | −5E−11 |

Figure 9:
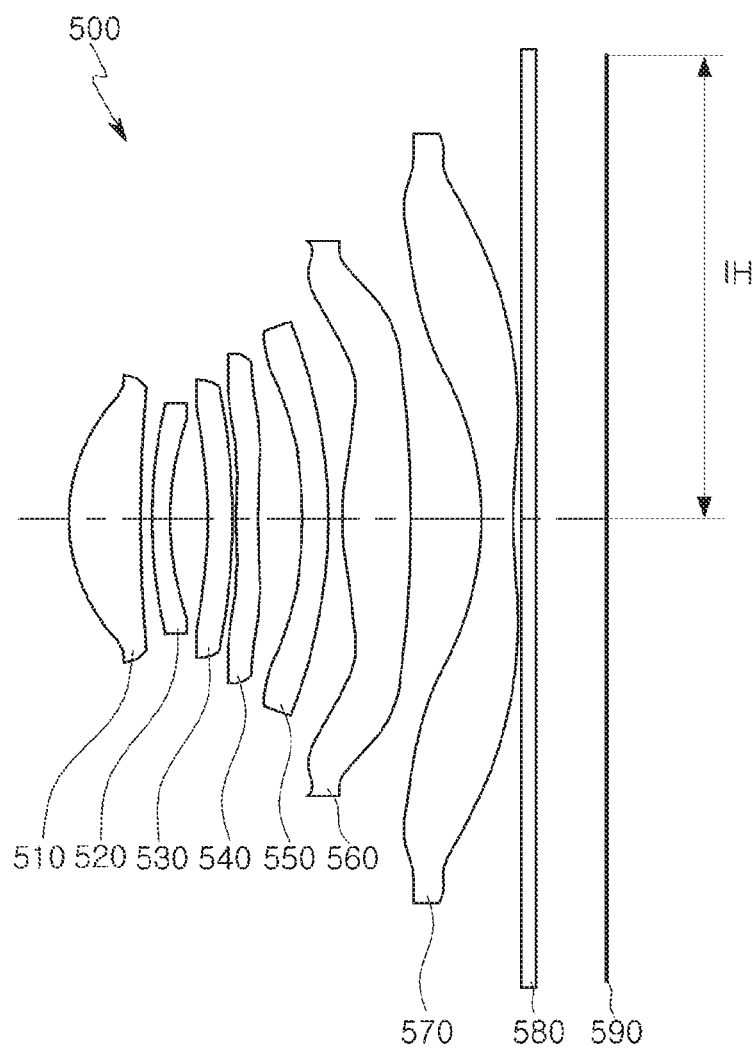
FIG. 9 is a configuration diagram of an imaging lens system according to a fifth example.

An imaging lens system according to a fifth example will be described with reference to FIG. 9.

An imaging lens system 500 includes a first lens 510, a second lens 520, a third lens 530, a fourth lens 540, a fifth lens 550, a sixth lens 560, and a seventh lens 570.

The first lens 510 has positive refractive power, and the first lens 510 has a convex shape on an object side surface and a concave shape on an image side surface. The second lens 520 has negative refractive power, and the second lens 520 has a convex shape on an object side surface and a concave shape on an image side surface. The third lens 530 has positive refractive power, and the third lens 530 has a concave shape on an object side surface and a convex shape on an image side surface. The fourth lens 540 has negative refractive power, and the fourth lens 540 has a convex shape on an object side surface and a concave shape on an image side surface. The fifth lens 550 has negative refractive power, and the fifth lens 550 has a concave shape on an object side surface and a convex shape on an image side surface. The sixth lens 560 has positive refractive power, and the sixth lens 560 has a convex shape on an object side surface and a convex shape on an image side surface. Further, the sixth lens 560 has a shape in which an inflection point is formed on the object side surface and the image side surface. The seventh lens 570 has negative refractive power, and the seventh lens 570 has a concave shape on an object side surface and a concave shape on an image side surface. Further, the seventh lens 570 has a shape in which an inflection point is formed on the object side surface and the image side surface.

The imaging lens system 500 further includes a filter 580 and an image sensor 590. The filter 580 is disposed between the seventh lens 570 and the image sensor 590. For reference, although not shown in the drawings, a stop may be disposed between the second lens 520 and the third lens 530.

Figure 10:
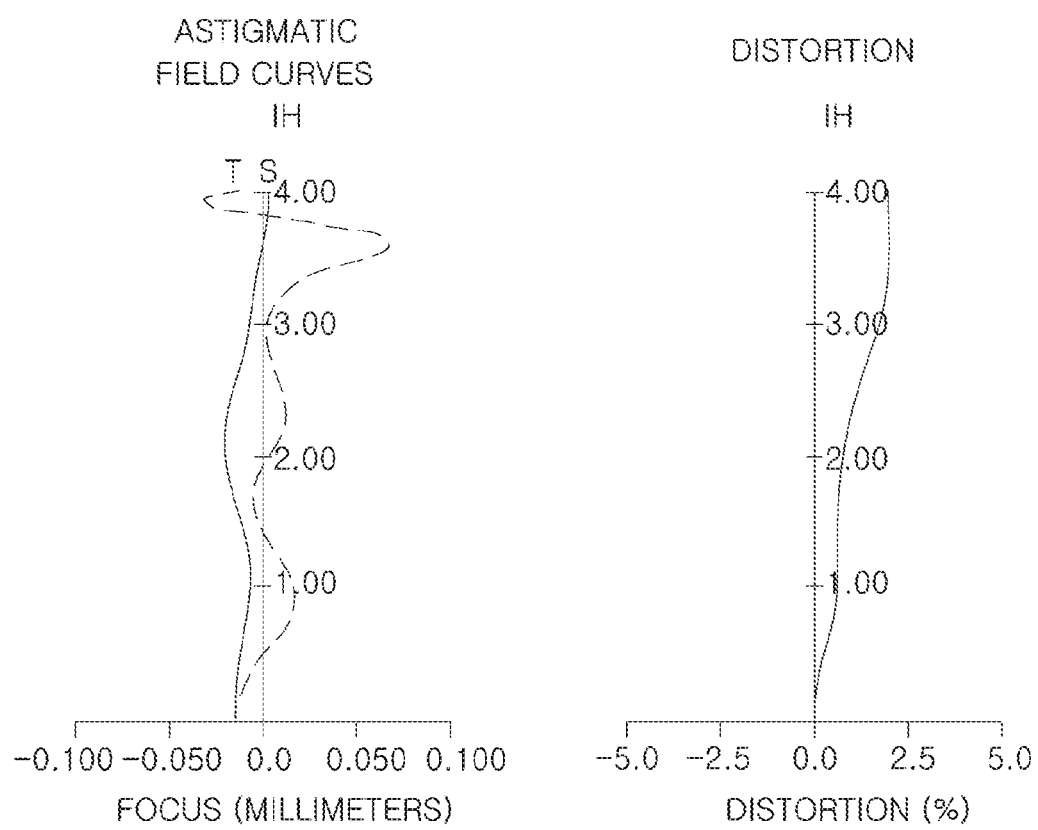
FIG. 10 illustrates aberration curves of the imaging lens system illustrated in FIG. 9.

The imaging lens system 500 illustrates aberration characteristics as shown in FIG. 10. Tables 9 and 10 illustrate lens characteristics and aspherical surface values of the imaging lens system 500.

TABLE 9

| Surface number | Reference | Radius of curvature | Thickness/ distance | Refractive index | Abbe number |
|---|---|---|---|---|---|
| S1 | First lens | 1.52 | 0.658 | 1.544 | 56.1 |
| S2 | | 4.89 | 0.110 | | |
| S3 | Second lens | 12.51 | 0.160 | 1.680 | 18.4 |
| S4 | | 5.15 | 0.339 | | |
| S5 | Third lens | −10.74 | 0.231 | 1.671 | 19.3 |
| S6 | | −4.53 | 0.028 | | |
| S7 | Fourth lens | 62.89 | 0.219 | 1.680 | 18.4 |
| S8 | | 11.87 | 0.408 | | |
| S9 | Fifth lens | −1.79 | 0.208 | 1.671 | 19.3 |
| S10 | | −2.74 | 0.134 | | |
| S11 | Sixth lens | 2.50 | 0.587 | 1.544 | 56.1 |
| S12 | | −17.87 | 0.675 | | |
| S13 | Seventh lens | −4.67 | 0.302 | 1.536 | 55.7 |
| S14 | | 3.06 | 0.080 | | |
| S15 | Filter | Infinity | 0.110 | 1.514 | 64.2 |
| S16 | | Infinity | 0.637 | | |
| Imaging plane | Imaging plane | Infinity | 0.014 | | |

TABLE 10

| Ex. 5 | K | A | B | C | D | E | F | G | H | J |
|---|---|---|---|---|---|---|---|---|---|---|
| S1 | −0.4556 | 0.0045 | 0.0713 | −0.2304 | 0.4766 | −0.6226 | 0.4898 | −0.2169 | 0.0384 | 0.0009 |
| S2 | −53.416 | 0.0101 | −0.0471 | −0.3087 | 1.91 | −4.8744 | 6.7738 | −5.3423 | 2.2455 | −0.3908 |
| S3 | 25.772 | −0.0431 | 0.2073 | −1.2924 | 6.65 | −18.752 | 30.672 | −29.175 | 15.043 | −3.255 |
| S4 | 16.982 | −0.0019 | 0.2059 | −1.0221 | 5.6376 | −18.247 | 34.947 | −39.243 | 24.012 | −6.1538 |
| S5 | −4.909 | 0.0692 | −0.5561 | 2.4962 | −7.2213 | 12.225 | −11.509 | 4.3178 | 1.0567 | −0.9305 |
| S6 | −67.744 | 0.5126 | −3.4999 | 12.086 | −26.154 | 36.64 | −33.367 | 18.956 | −5.9958 | 0.7865 |
| S7 | −93.715 | 0.5346 | −3.4851 | 9.8348 | −17.031 | 18.404 | −12.078 | 4.586 | −0.903 | 0.068 |
| S8 | −93.715 | 0.5346 | −3.4851 | 9.8348 | −17.031 | 18.404 | −12.078 | 4.586 | −0.903 | 0.068 |
| S9 | −4.93 | 0.2354 | −0.4152 | 0.4545 | −0.337 | 0.1146 | 0.0154 | −0.0228 | 0.0057 | −0.0004 |
| S10 | −1.1726 | 0.0897 | −0.1308 | 0.1553 | −0.1211 | 0.0644 | −0.0248 | 0.0067 | −0.0011 | 8E−05 |
| S11 | −15.045 | −0.0595 | 0.0543 | −0.0624 | 0.0384 | −0.0161 | 0.0047 | −0.0008 | 8E−05 | −3E−06 |
| S12 | 51.031 | 0.0163 | −0.0102 | 0.0091 | −0.0123 | 0.0076 | −0.0026 | 0.0005 | −5E−05 | 2E−06 |
| S13 | −0.5311 | −0.1895 | 0.1353 | −0.0464 | 0.0099 | −0.0014 | 0.0001 | −9E−06 | 4E−07 | −7E−09 |
| S14 | −28.087 | −0.1055 | 0.0527 | −0.0167 | 0.0034 | −0.0004 | 3E−05 | −6E−07 | −2E−08 | 1E−09 |

Table 11 illustrates characteristic values of the imaging lens systems according to the first example to the fifth example.

TABLE 11

| Reference | First Example | Second Example | Third Example | Fourth Example | Fifth Example |
|---|---|---|---|---|---|
| TTL | 6.000 | 7.100 | 7.100 | 6.700 | 4.900 |
| BFL | 0.941 | 0.895 | 0.850 | 1.071 | 0.842 |
| f | 5.130 | 6.400 | 6.300 | 5.690 | 4.330 |
| f1 | 4.481 | 5.208 | 5.213 | 4.682 | 3.764 |
| f2 | −12.86 | −13.31 | −13.39 | −11.10 | −12.84 |
| f3 | 9.641 | 10.203 | 13.946 | 9.735 | 11.387 |
| f4 | −11.95 | −9.78 | −16.25 | −13.48 | −21.35 |
| f5 | −16.80 | −22.30 | −28.89 | −12.60 | −8.311 |
| f6 | 4.944 | 7.174 | 8.241 | 5.052 | 4.054 |
| f7 | −4.003 | −5.812 | −5.505 | −4.470 | −3.404 |
| Fno | 1.800 | 2.000 | 2.000 | 1.700 | 2.000 |
| IH | 4.546 | 5.700 | 5.700 | 4.650 | 4.000 |
| FOV | 82.20 | 83.40 | 83.10 | 77.30 | 84.10 |
| SD5 | 2.263 | 2.546 | 2.609 | 2.301 | 2.301 |
| SD6 | 3.023 | 4.091 | 4.079 | 3.461 | 3.461 |
| SD7 | 3.795 | 4.576 | 4.607 | 3.951 | 3.951 |

Further, the imaging lens system according to the examples may generally have optical characteristics as follows. For example, a total length TTL of the imaging lens system is within a range of 4.7 to 7.4 mm, a total focal length is within a range of 4.1 to 6.6 mm, a focal length of the first lens is within a range of 3.4 to 5.6 mm, a focal length of the second lens is within a range of −15 to −10 mm, a focal length of the third lens is within a range of 8.0 to 15 mm, a focal length of the fourth lens is within a range less than −30 to −8.0 mm, a focal length of the fifth lens is within a range of −40 to −7.0 mm, a focal length of the sixth lens is within a range of 3.6 to 9.0 mm, and a focal length of the seventh lens is within a range of −7.0 to −3.0 mm. Further, an angle of view FOV of the imaging lens system is within a range of 76 to 86 degrees.

Table 12 illustrates conditional expression values of the imaging lens systems according to the first example to the fifth example.

TABLE 12

| Conditional expression | First Example | Second Example | Third Example | Fourth Example | Fifth Example |
|---|---|---|---|---|---|
| f1/f | 0.873 | 0.814 | 0.827 | 0.823 | 0.869 |
| V1 − V2 | 37.7 | 36.8489 | 37.68 | 36.84 | 37.67 |
| V1 − V3 | 32.6 | 35.7416 | 32.57 | 32.56 | 36.84 |
| V1 − V4 | 37.7 | 36.8489 | 36.85 | 36.84 | 37.67 |
| V1 − V5 | 32.2 | 32.5667 | 30.14 | 32.56 | 36.84 |
| f2/f | −2.507 | −2.080 | −2.125 | −1.950 | −2.966 |
| f3/f | 1.879 | 1.594 | 2.214 | 1.711 | 2.630 |
| f4/f | −2.330 | −1.527 | −2.580 | −2.369 | −4.930 |
| f5/f | −3.275 | −3.484 | −4.586 | −2.215 | −1.919 |
| f6/f | 0.964 | 1.121 | 1.308 | 0.888 | 0.936 |
| f7/f | −0.780 | −0.908 | −0.874 | −0.786 | −0.786 |
| TTL/f | 1.170 | 1.109 | 1.127 | 1.178 | 1.132 |
| f1/f2 | −0.348 | −0.391 | −0.389 | −0.422 | −0.293 |
| f2/f3 | −1.334 | −1.304 | −0.960 | −1.140 | −1.128 |
| BFL/f | 0.184 | 0.140 | 0.135 | 0.188 | 0.194 |
| D12/f | 0.027 | 0.017 | 0.017 | 0.028 | 0.025 |
| SD5/IH | 0.498 | 0.447 | 0.458 | 0.495 | 0.575 |
| SD6/IH | 0.665 | 0.718 | 0.716 | 0.744 | 0.865 |
| SD7/IH | 0.835 | 0.803 | 0.808 | 0.850 | 0.988 |

As set forth above, according to the examples, performance of a compact camera may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
a first lens, a second lens, a third lens, a fourth lens, and a fifth lens spaced apart from each other and sequentially disposed in ascending numerical order along an optical axis of the imaging lens system from an object side of the imaging lens system toward an imaging plane of the imaging lens system, wherein a refractive index of each of the second lens, the third lens, the fourth lens, and the fifth lens is 1.6 or greater, the third lens has a convex image-side surface in a paraxial region thereof, and TTL/2IH<0.730, where TTL is a distance along the optical axis from an object-side surface of the first lens to the imaging plane, and 2IH is a diagonal length of the imaging plane.

2. The imaging lens system of claim 1, wherein the first lens has a concave image-side surface in a paraxial region thereof.

3. The imaging lens system of claim 1, wherein the third lens has a concave object-side surface in a paraxial region thereof.

4. The imaging lens system of claim 1, wherein the fourth lens has a convex object-side surface in a paraxial region thereof.

5. The imaging lens system of claim 1, wherein the fifth lens has a concave object-side surface in a paraxial region thereof.

6. The imaging lens system of claim 1, wherein the fifth lens has a negative refractive power.

7. The imaging lens system of claim 1, wherein TTL/2IH<0.613.

8. The imaging lens system of claim 1, further comprising a sixth lens disposed on the optical axis between the fifth lens and the imaging plane and spaced apart therefrom, and having a positive refractive power.

9. The imaging lens system of claim 8, further comprising a seventh lens disposed on the optical axis between the sixth lens and the imaging plane and spaced apart therefrom, and having a concave object-side surface in a paraxial region thereof.

10. An imaging lens system comprising:
a first lens, a second lens, a third lens, a fourth lens, a fifth lens, a sixth lens, and a seventh lens spaced apart from each other and sequentially disposed along an optical axis of the imaging lens system in ascending numerical order from an object side of the imaging lens system toward an imaging plane of the imaging lens system, wherein TTL/2IH<0.613, where TTL is a distance along the optical axis from an object-side surface of the first lens to the imaging plane, and 2IH is a diagonal length of the imaging plane.

11. The imaging lens system of claim 10, wherein 25<V1-V3<45, where V1 is an Abbe number of the first lens, and V3 is an Abbe number of the third lens.

12. The imaging lens system of claim 10, wherein 25<V1-V4<45, where V1 is an Abbe number of the first lens, and V4 is an Abbe number of the fourth lens.

13. The imaging lens system of claim 10, wherein 1.5<f3/f, where f is a focal length of the imaging lens system, and f3 is a focal length of the third lens.

14. The imaging lens system of claim 10, wherein TTL/f<1.4, where f is a focal length of the imaging lens system.

15. The imaging lens system of claim 10, wherein −2.0<f2/f3<0, where f2 is a focal length of the second lens, and f3 is a focal length of the third lens.

16. An imaging lens system comprising:
a first lens, a second lens, a third lens, a fourth lens, a fifth lens, a sixth lens, and a seventh lens spaced apart from each other and sequentially disposed along an optical axis of the imaging lens system from an object side of the imaging lens system toward an imaging plane of the imaging lens system, wherein the third lens has a convex image-side surface in a paraxial region thereof, the fourth lens has a concave image-side surface in a paraxial region thereof;

the fifth lens has a negative refractive power and a refractive index of 1.6 or greater, and TTL/2IH<0.730, where TTL is a distance along the optical axis from an object-side surface of the first lens to the imaging plane, and 2IH is a diagonal length of the imaging plane.

17. The imaging lens system of claim 16, wherein a refractive power of the first lens is greater than a refractive power of the sixth lens, and the refractive power of the sixth lens is greater than a refractive power of the third lens.

* * * * *